United States Patent
Niki et al.

(10) Patent No.: US 11,828,661 B2
(45) Date of Patent: Nov. 28, 2023

(54) CORE BODY THERMOMETER

(71) Applicant: Murata Manufacturing Co., Ltd., Nagaokakyo (JP)

(72) Inventors: Yoshiki Niki, Nagaokakyo (JP); Toru Shimuta, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 453 days.

(21) Appl. No.: 16/929,495

(22) Filed: Jul. 15, 2020

(65) Prior Publication Data
US 2020/0340865 A1    Oct. 29, 2020

Related U.S. Application Data

(63) Continuation of application No. PCT/JP2019/005948, filed on Feb. 19, 2019.

(30) Foreign Application Priority Data

Mar. 2, 2018    (JP) .................. 2018-037800

(51) Int. Cl.
*G01K 7/16*    (2006.01)
*G01K 1/02*    (2021.01)
*G01K 13/20*    (2021.01)

(52) U.S. Cl.
CPC ............... *G01K 7/16* (2013.01); *G01K 1/026* (2013.01); *G01K 13/20* (2021.01)

(58) Field of Classification Search
CPC .................. G01K 7/16; G01K 1/026
See application file for complete search history.

(56) References Cited

U.S. PATENT DOCUMENTS

| | | | |
|---|---|---|---|
| 8,227,897 B2 * | 7/2012 | Kim ................ | H10B 43/40 257/536 |
| 2010/0121217 A1 | 5/2010 | Padiy et al. | |

FOREIGN PATENT DOCUMENTS

| | | | |
|---|---|---|---|
| JP | 36358223 A | | 3/1988 |
| JP | 2012073127 A | | 4/2012 |
| JP | 2012154859 A | * | 8/2012 |
| JP | 2012154859 A | | 8/2012 |
| JP | 2012207943 A | * | 10/2012 |

(Continued)

OTHER PUBLICATIONS

International Search Report issued for PCT/JP2019/005948, dated May 28, 2019.

(Continued)

*Primary Examiner* — Natalie Huls
*Assistant Examiner* — Cynthia L Davis
(74) *Attorney, Agent, or Firm* — ArentFox Schiff LLP (57) ABSTRACT

A core body thermometer is provided that includes a plate-shaped wiring substrate having a first region and a second region having different thermal resistances, a first temperature sensor and a second temperature sensor located in a first region and across a thickness direction of the first region and a third temperature sensor and a fourth temperature sensor located in a second region and across a thickness direction of the second region. Moreover, a processing circuit is provided that processes output signals of the first, second, third and fourth temperature sensors. The first and second regions are adjusted to have the different thermal resistances by varying occupancy and/or dispersion of the conductive patterns.

21 Claims, 5 Drawing Sheets

(56) References Cited

FOREIGN PATENT DOCUMENTS

| JP | 2012207943 | A | | 10/2012 |
|---|---|---|---|---|
| JP | 2013200152 | A | | 10/2013 |
| JP | 2016114467 | A | * | 6/2016 |
| JP | 2017131541 | A | | 8/2017 |

OTHER PUBLICATIONS

Written Opinion of the International Searching Authority issued for PCT/JP2019/005948, dated May 28, 2019.

* cited by examiner

CORE BODY THERMOMETER

CROSS REFERENCE TO RELATED APPLICATIONS

The present application is a continuation of PCT/JP2019/005948 filed Feb. 19, 2019, which claims priority to Japanese Patent Application No. 2018-037800, filed Mar. 2, 2018, the entire contents of each of which are incorporated herein by reference.

TECHNICAL FIELD

The present invention relates to a non-heating-type core body thermometer that measures a core body temperature.

BACKGROUND

Currently, there are known to be existing non-heating-type core body thermometers (e.g., heat flow-type core body thermometer), for example, as described in Patent Document 1 (identified below).

The core body thermometer described in Patent Document 1 includes a first and second thermal resistors each having a first temperature sensor disposed on one surface making contact with a body surface and a second temperature sensor disposed on the other surface opposing the one surface, a homogenizing member configured to cover only the other surfaces of the first and second thermal resistors, a heat insulating member disposed to surround side surfaces of the first and second thermal resistors, and a protection member having a peripheral portion that is fixed to the other surface of the heat insulating member and a central portion of which is disposed with a predetermined space between the central portion and the homogenizing member. Further, the entire body surface side of the core body thermometer is covered with an adhesive tape.

Patent Document 1: Japanese Unexamined Patent Application Publication No. 2012-154859.

The core body thermometer described in Patent Document 1 includes two pairs of temperature sensors including the first temperature sensors that make contact with the body surface when the core body thermometer is attached to the body surface of the subject and the second temperature sensors that are disposed to oppose the first temperature sensors with heat insulating materials interposed therebetween. The thicknesses of the heat insulating materials on which the pairs of temperature sensors are disposed differ from each other. Moreover, a heat flow rate from a deep portion is obtained by detecting temperature differences between the first temperature sensor and the second temperature sensor of each pair of temperature sensors, thereby calculating the body temperature of the deep portion.

With this configuration, thermal resistance values are made different by changing the thicknesses of the thermal resistors. Therefore, the shape of the homogenizing member needs to be also stepped and the shape becomes complicated, which causes increase in manufacturing cost.

SUMMARY OF THE INVENTION

The exemplary embodiments of the present invention have been made in order to solve the above-described problem. Thus, it is an object thereof to provide a core body thermometer that reduces manufacturing cost without lowering measurement accuracy.

A core body thermometer according to an exemplary aspect is provided that includes a flat plate-shaped thermal resistor having a first region and a second region having different thermal resistances; a first temperature sensor and a second temperature sensor arranged so as to interpose the first region from a thickness direction of the first region, and a third temperature sensor and a fourth temperature sensor arranged so as to interpose the second region from a thickness direction of the second region. Moreover, a processing circuit is provided that processes output signals of the first temperature sensor, the second temperature sensor, the third temperature sensor, and the fourth temperature sensor. According to the exemplary embodiment, the first region and the second region are adjusted to have the different thermal resistances by varying occupancy and/or dispersion of a conductive member(s).

The core body thermometer according to the exemplary aspect includes the flat plate-shaped thermal resistor having the first region and the second region having the different thermal resistances. Further, the first region and the second region are adjusted to have the different thermal resistances by varying the occupancy and/or dispersion of the conductive member(s). Therefore, the flat plate-shaped thermal resistor can be provided to have the first region and the second region having the different thermal resistances without changing the thickness thereof. That is to say, the thickness of the thermal resistor having the two regions having the different thermal resistance values can be made uniform, and the shape thereof can be simplified. As a result, the manufacturing cost can be reduced without lowering the measurement accuracy.

According to the exemplary embodiments of the present invention, a flat plate-shaped thermal resistor having the first region and the second region having the different thermal resistances is provided. Further, the first region and the second region are adjusted to have the different thermal resistances by varying the occupancy and/or dispersion of the conductive member(s). Therefore, the manufacturing cost can be reduced without lowering the measurement accuracy.

DETAILED DESCRIPTION OF EMBODIMENTS

Hereinafter, exemplary embodiments of the present invention will be described in detail with reference to the accompanying drawings. In the drawings, the same or corresponding parts will be denoted by the same reference numerals. In the drawings, the same components are denoted by the same reference numerals, and overlapped description thereof will be omitted.

First Exemplary Embodiment

Figure 1:
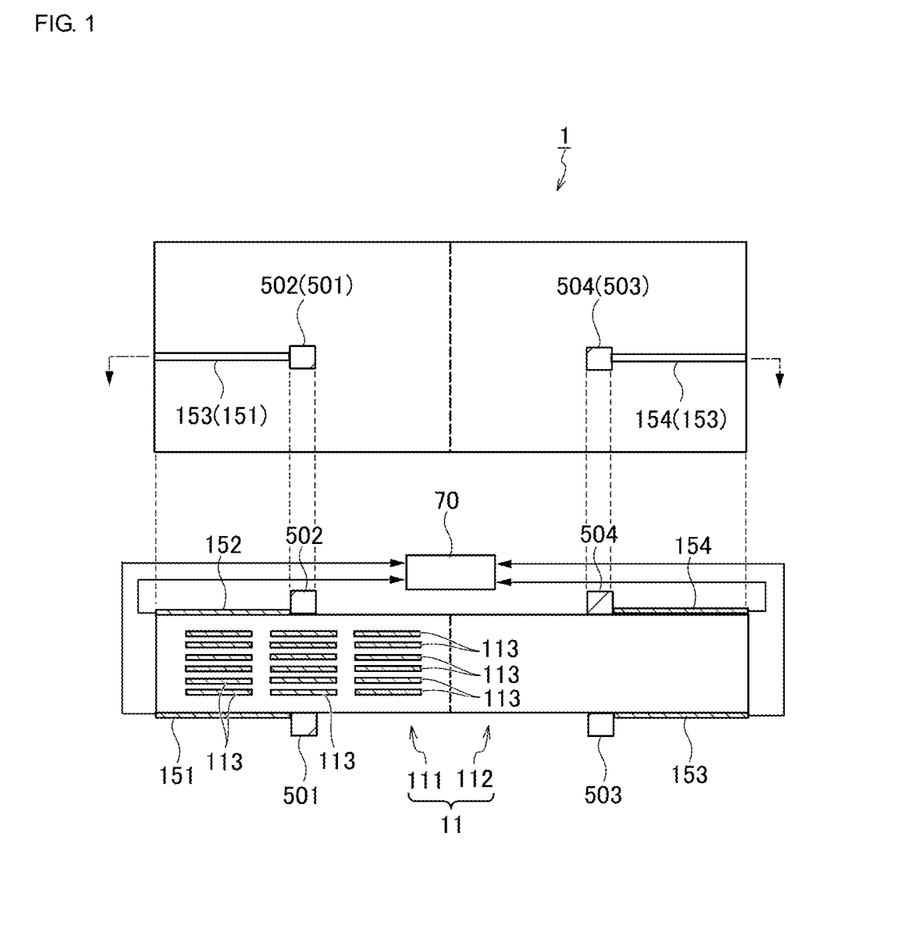
FIG. 1 is a plan view and a cross-sectional view illustrating the configuration of a core body thermometer according to a first exemplary embodiment.

First, the configuration of a core body thermometer 1 according to a first embodiment will be described with reference to FIG. 1. FIG. 1 is a plan view (i.e., an upper view) and a cross-sectional view (i.e., a lower view) illustrating the configuration of the core body thermometer 1.

The core body thermometer 1 is a non-heating-type core body thermometer that obtains a heat flow rate from a deep portion of a user (e.g., a subject) based on difference between a temperature detected by a first temperature sensor 501 and a temperature detected by a second temperature sensor 502 and difference between a temperature detected by a third temperature sensor 503 and a temperature detected by a fourth temperature sensor 504 to acquire a core body temperature. In particular, the core body thermometer 1 can simplify the shape thereof and reduce manufacturing cost without lowering measurement accuracy.

The core body thermometer 1 mainly includes a wiring substrate 11, the first temperature sensor 501 to the fourth temperature sensor 504 mounted on the wiring substrate 11, and a processing circuit 70 that is configured to process detection signals (e.g., output voltages) of the first temperature sensor 501 to the fourth temperature sensor 504 to obtain the core body temperature. Hereinafter, the components will be described in detail.

The wiring substrate 11 is, for example, a rectangular thin plate-shaped substrate (e.g., a printed substrate) formed of an insulator such as Flame Retardant Type 4 ("FR-4") and ceramic, for example. Further, the wiring substrate 11 is a multilayer wiring substrate having a plurality of inner layers.

The wiring substrate 11 has a first region 111 and a second region 112 having different thermal resistances. That is to say, the wiring substrate 11 is configured to function as a thermal resistor for forming two different heat fluxes.

The first region 111 and the second region 112 are adjusted to have different thermal resistance values (i.e., thermal conductivities) by varying the occupancy (for example, the number, the width, the length, the thickness, or the like) and/or dispersion (for example, arrangement or the like) of conductive patterns 113 (corresponding to a conductive member(s)) relative to the whole wiring substrate 11.

More specifically, the first region 111 is configured by alternately laminating insulating layers formed of, for example, FR-4 or the like and the conductive patterns (i.e., pattern layers) 113. Each conductive pattern 113 is made of, for example, copper foil or the like and is formed in a band shape. On the other hand, the second region 112 does not include the conductive pattern (i.e., a pattern layer) 113 and is formed by laminating only a plurality of insulating layers. Therefore, the thermal resistance value of the first region 111 is lower than the thermal resistance value of the second region 112.

The thermal conductivity of metal such as copper is equal to or higher than 100 [W/m/K] whereas the thermal conductivity of FR-4 is about 0.4 [W/m/K]. Therefore, the amount of the conductive patterns 113 (i.e., the amount of copper foil) and the thermal resistance value are inversely proportional to each other. That is to say, when the amount of the conductive patterns 113 increases, the thermal resistance value decreases. Accordingly, the thermal resistance value of the first region 111 varies by changing the number, the width, the length, the thickness, arrangement, or the like of the conductive patterns 113 included in the first region 111. In the example illustrated in the cross-sectional view of FIG. 1, the conductive patterns 113 are arranged in a matrix form of six rows and three columns. It should be appreciated that this configuration is merely provided as an example.

With the above-mentioned configuration, heat flow can be adjusted by varying the occupancy of metal such as copper foil that is used in the wiring substrate 11. Therefore, adjustment of the amount of the conductive patterns 113 can provide difference in the heat flow between the first region 111 and the second region 112 while the thickness of the wiring substrate 11 (that is, the thicknesses of the first region 111 and the second region 112) is made uniform. As a result, the shape can be simplified by forming the first region 111 and the second region 112 so as to have substantially the same thickness.

The conductive patterns 113 are preferably independent of the processing circuit 70 in order to prevent the conductive patterns 113 from being affected by heat generation in the processing circuit 70. That is to say, it is preferable that the conductive patterns 113 be not electrically connected (i.e., electrically insulated) to electronic components configuring the processing circuit 70 and no current flow therethrough.

Hereinafter, in the present specification, a conductive pattern for electrically connecting the electronic components will be referred to as a wiring pattern and an independent conductive pattern that is connected to no electronic component will be referred to as a thermally conductive pattern to distinguish them. It is noted that holes, slit-shaped gaps, or the like for reducing thermal conduction between the first region 111 and the second region 112 may be formed in a boundary region therebetween, for example.

Figure 2:
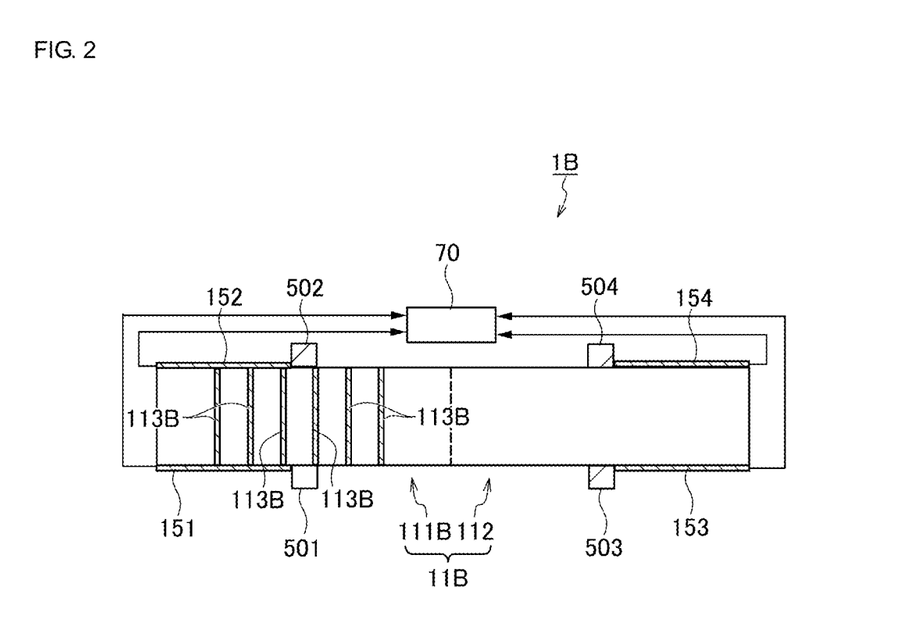
FIG. 2 is a cross-sectional view illustrating the configuration of a core body thermometer according to a variation of the exemplary embodiment.

As illustrated in the cross-sectional view of FIG. 2, the thermal resistance value may be adjusted by using interlayer vias (or through-holes) 113B penetrating through the wiring substrate 11B (insulating layers) in the thickness direction instead of the thermally conductive patterns 113 shown in FIG. 1. Further, the thermal resistance value may be adjusted by combining the thermally conductive patterns 113 and the interlayer vias (or through-holes) 113B in an alternative aspect. FIG. 2 is a cross-sectional view illustrating the configuration of a core body thermometer 1B according to a variation.

Referring back to FIG. 1, the first temperature sensor 501 that acquires the temperature of the lower surface (e.g., user's body surface side) of the first region 111 configuring the wiring substrate 11 is mounted on the lower surface of the first region 111. On the other hand, the second temperature sensor 502 that acquires the temperature of the upper surface (e.g., outside air side) of the first region 111 configuring the wiring substrate 11 is mounted on the upper surface of the first region 111. Similarly, the third temperature sensor 503 that acquires the temperature of the lower surface (e.g., user's body surface side) of the second region 112 configuring the wiring substrate 11 is mounted on the lower surface of the second region 112. On the other hand, the fourth temperature sensor 504 that detects the temperature of the upper surface (e.g., outside air side) of the second region 112 configuring the wiring substrate 11 is mounted on the upper surface of the second region 112.

That is to say, the first temperature sensor 501 and the second temperature sensor 502 are arranged so as to interpose the first region 111 from the thickness direction of the first region 111. Similarly, the third temperature sensor 503 and the fourth temperature sensor 504 are arranged so as to interpose the second region 112 from the thickness direction of the second region 112. The pair of the first temperature sensor 501 and the second temperature sensor 502 is therefore arranged along the thickness direction of the first region 111. Similarly, the pair of the third temperature sensor 503 and the fourth temperature sensor 504 are arranged along the thickness direction of the second region 112.

As the first temperature sensor 501 to the fourth temperature sensor 504 (hereinafter, collectively referred to as "temperature sensors 50" in some examples), for example, thermistors, temperature measuring resistors, or the like whose resistance values vary depending on temperatures are preferably used. It is noted that the heat capacities of the temperature sensors 50 are preferably as low as possible from the viewpoint of enhancing the responsiveness. Therefore, for example, chip thermistors are preferably used as the temperature sensors 50. The first temperature sensor 501 to the fourth temperature sensor 504 are electrically connected to the processing circuit 70 (e.g., an MCU) with the wiring patterns (e.g., printed wiring) 151 to 154 interposed therebetween, respectively, and detection signals (e.g., output voltages) corresponding to the temperatures are read by the processing circuit 70.

The processing circuit 70 is configured to process the thermal resistance values of the first region 111 and the second region 112 and the detection signals (e.g., output voltages) of the first temperature sensor 501, the second temperature sensor 502, the third temperature sensor 503, and the fourth temperature sensor 504 to acquire the core body temperature. The processing circuit 70 is preferably mounted in a region that does not affect the heat flow of the wiring substrate 11 (the first region 111 and the second region 112). The arrangement of the processing circuit 70 will be described in detail in a third embodiment, which will be described later.

According to an exemplary aspect, the processing circuit 70 includes a temperature input circuit and an arithmetic processing circuit. The temperature input circuit is configured to include, for example, an amplifier (for example, an operational amplifier), an analog/digital converter (A/D converter), and the like for reading the detection signals (output voltages) of the temperature sensors 50. The temperature input circuit amplifies the analog signals output from respective temperature sensors 50, converts the amplified analog signals into digital signals, and outputs the digital signals to the arithmetic processing circuit.

The arithmetic processing circuit is configured to calculate the core body temperature from read temperature data. The arithmetic processing circuit includes, for example, a micro control unit ("MCU"), an EEPROM, a RAM, and the like, and calculates the core body temperature based on the detection values of respective temperature sensors 50 that have been read using the temperature input circuit. The arithmetic processing circuit stores the calculated core body temperature data in a memory such as the RAM. Further, the arithmetic processing circuit can be configured to output the calculated core body temperature data to a wireless communication unit to output (e.g., transmit) it to an external device wirelessly.

The arithmetic processing circuit is configured to calculate (e.g., estimate) the core body temperature based on the temperature differences between the front and back sides of the first region 111 and the second region 112, the temperature differences being generated by difference between two heat fluxes that are formed by using the two regions (i.e., the first region 111 and the second region 112) having the different thermal resistances.

More specifically, the arithmetic processing circuit calculates a core body temperature Tb based on, for example, the following expression (1):

$$Tb = \{T1(T3-T4)*Ra1 - T3(T1-T2)*Ra2\} / \{(T3-T4)*Ra1 - (T1-T2)*Ra2\} \quad (1)$$

It is noted that Tb represents the core body temperature, T1 represents the temperature detected by the first temperature sensor 501, T2 represents the temperature detected by the second temperature sensor 502, and Ra1 represents the thermal resistance value of the first region (i.e., thermal resistor) 111. Further, T3 represents the temperature detected by the third temperature sensor 503, T4 represents the temperature detected by the fourth temperature sensor 504, and Ra2 represents the thermal resistance value of the second region (i.e., thermal resistor) 112.

Since Ra1 and Ra2 are known, the core body temperature Tb can be uniquely obtained by detecting four temperatures (T1, T2, T3, and T4).

To manufacture the above-described core body thermometer 1, first, the plurality of insulating layers and the plurality of thermally conductive patterns 113 (e.g., pattern layers) are alternately laminated. In this case, the thermally conductive patterns 113 are laminated only in the first region 111, so that the wiring substrate 11 having the first region 111 and the second region 112 is formed. Subsequently, the first temperature sensor 501 to the fourth temperature sensor 504 and the electronic components configuring the processing circuit 70 are mounted by soldering or the like. The core body thermometer 1 is manufactured in the above-described manner. It is preferable that the core body thermometer 1 be accommodated in a case.

The core body thermometer 1 can obtain the core body temperature data by, for example, being attached to the body surface of the user (e.g., a measurement subject) and measuring the core body temperature continuously. When the core body thermometer 1 assembled as described above is used, first, it is powered ON by pressing a power supply switch, and then, is attached to a measurement site of the user. When the core body thermometer 1 is powered ON, measurement of the core body temperature, storage of the measurement data in the memory, and wireless data output are started. When the core body temperature is measured, the measurement site is preferably chest, axillary, back, waist, neck, occipital, or forehead. When the body temperature variation is measured, the measurement site may be abdomen, flank, thigh, ankle, arm, wrist, or the like.

As described in detail above, according to the embodiment, the flat plate-shaped wiring substrate 11 having the first region 111 and the second region 112 having the different thermal resistances is included. Further, the first region 111 and the second region 112 are adjusted to have the different thermal resistances by varying the occupancy and/or dispersion of the thermally conductive patterns 113. Therefore, the flat plate-shaped thermal resistor can be provided that has the first region 111 and the second region 112 having the different thermal resistances without changing the thickness thereof. That is to say, the wiring substrate 11 can be used as a thermal resistor, and the thickness of the thermal resistor having the two regions having the different thermal resistance values can be made uniform, and the shape thereof can be simplified. As a result, the manufacturing cost can be reduced without lowering the measurement accuracy.

According to the embodiment, the wiring substrate 11 can be manufactured by a similar manufacturing method to that of a general wiring substrate (e.g., a printed substrate), thereby manufacturing the wiring substrate 11 at low cost. Further, when the processing circuit 70 is mounted on the wiring substrate 11 that is used as the thermal resistor, it is not necessary to exclusively provide a wiring substrate for mounting the processing circuit 70. It is therefore possible to reduce the size of the core body thermometer 1.

According to the embodiment, the multilayer wiring substrate is used as the wiring substrate 11. Therefore, it is easy to locally adjust the thermal resistance also in the thickness direction. Further, the area can be reduced by laminating the region in which the thermal resistance is adjusted and the processing circuit 70.

Second Exemplary Embodiment

In addition to the configuration of the core body thermometer 1 according to the first embodiment described above, in order to prevent only the temperature of a part of the wiring substrate 11 from being changed due to influences of the outside air temperature and the like, a thermally homogenizing layer is preferably provided on the back side (e.g., outside air side) of the mounting surface on which the second temperature sensor 502 and the fourth temperature sensor 504 are mounted, that is, on the back side (outside air side) of the first region 111 and the second region 112. The thermally homogenizing layer has high thermal conductivity and thermally homogenizes influences by temperature distribution of the outside air temperature.

Figure 3:
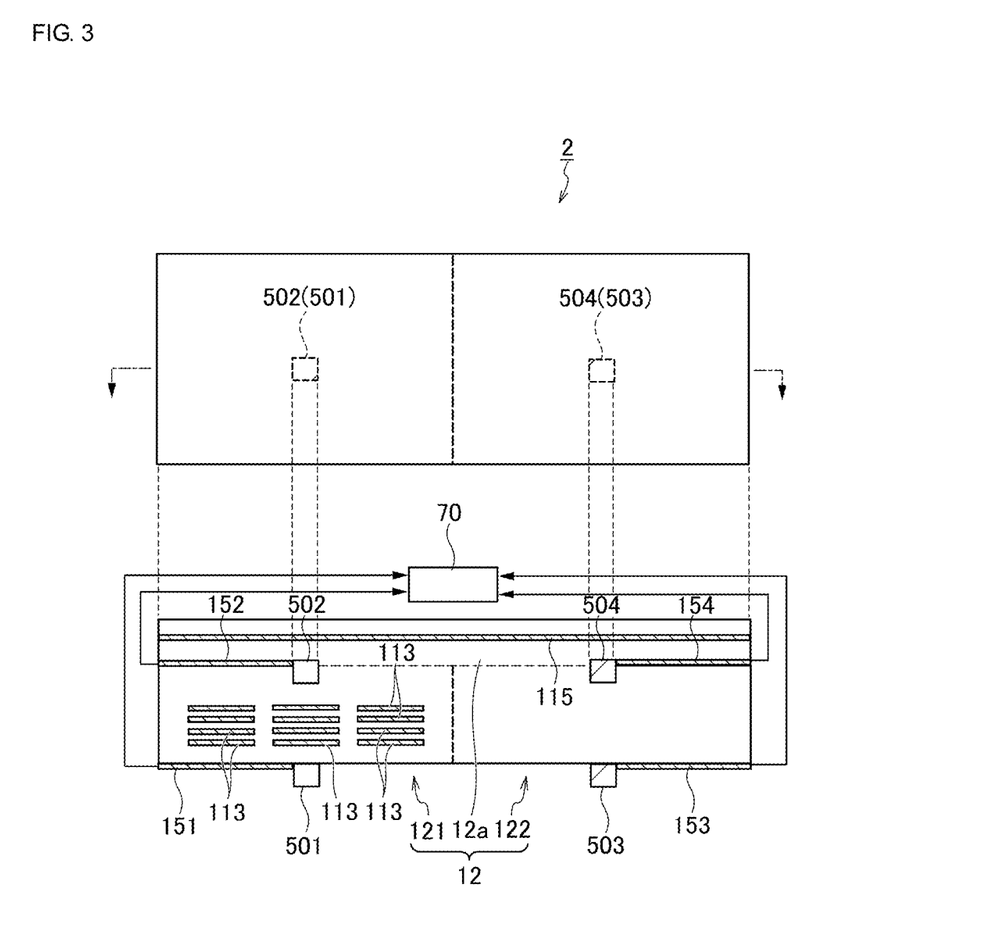
FIG. 3 is a plan view and a cross-sectional view illustrating the configuration of a core body thermometer according to a second exemplary embodiment.

Next, a core body thermometer 2 according to the second embodiment will be described with reference to FIG. 3. It is noted that description of the same or similar components as or to those in the above-described first embodiment will be simplified or omitted, and different points will be mainly described. FIG. 3 is a plan view (i.e., an upper view) and a cross-sectional view (i.e., a lower view) illustrating the configuration of the core body thermometer 2. In FIG. 3, components that are the same as or equivalent to those in the first embodiment are denoted by the same reference numerals as those in the first embodiment.

As shown, the core body thermometer 2 is different from the core body thermometer 1 described above in that it further includes a thermally homogenizing layer 115 formed on the back side of the first temperature sensor 501 and the second temperature sensor 502, that is, on the back side (e.g., outside air side) of the first region 121 and on the back side of the third temperature sensor 503 and the fourth temperature sensor 504, that is, on the back side (outside air side) of the second region 122.

As the thermally homogenizing layer 115, metal foil, a metal thin plate, or the like may be used. It is however preferable that the thermally homogenizing layer 115 be formed as a thermally conductive pattern of an inner layer of a wiring substrate 12*a*. In this case, the thermally conductive pattern that is used as the thermally homogenizing layer 115 is preferably a solid pattern. Further, the thermally conductive pattern that is used as the thermally homogenizing layer 115 may be a ground pattern. However, the thermally conductive pattern is preferably an independent pattern that is not connected to the processing circuit 70 and through which no current flows. It should be appreciated that other configurations are the same as or similar to those of the above-described first embodiment, and thus detailed description thereof will be omitted here.

According to the exemplary embodiment, the solid pattern that is configured to function as the thermally homogenizing layer 115 is included. It is therefore possible to reduce influences on heat flow by fluctuation of the outside air temperature and heat generation of the electronic components configuring the processing circuit 70 and to stabilize heat flow systems in a first region 121 and a second region 122, thereby improving the measurement accuracy.

In addition, according to the embodiment, the thermally homogenizing layer 115 can be formed as the solid pattern of the wiring substrate 12*a* integrally with the first region 121 and the second region 122 (thermal resistor). Accordingly, it is not necessary to manufacture the thermally homogenizing layer 115 separately, thereby reducing the cost and reducing the size of the apparatus.

Third Exemplary Embodiment

According to another exemplary aspect, instead of the first region 121 and the second region 122 described above, thermal resistors having the same (or substantially the same) thickness and different thermal resistance values may be used.

Figure 4:
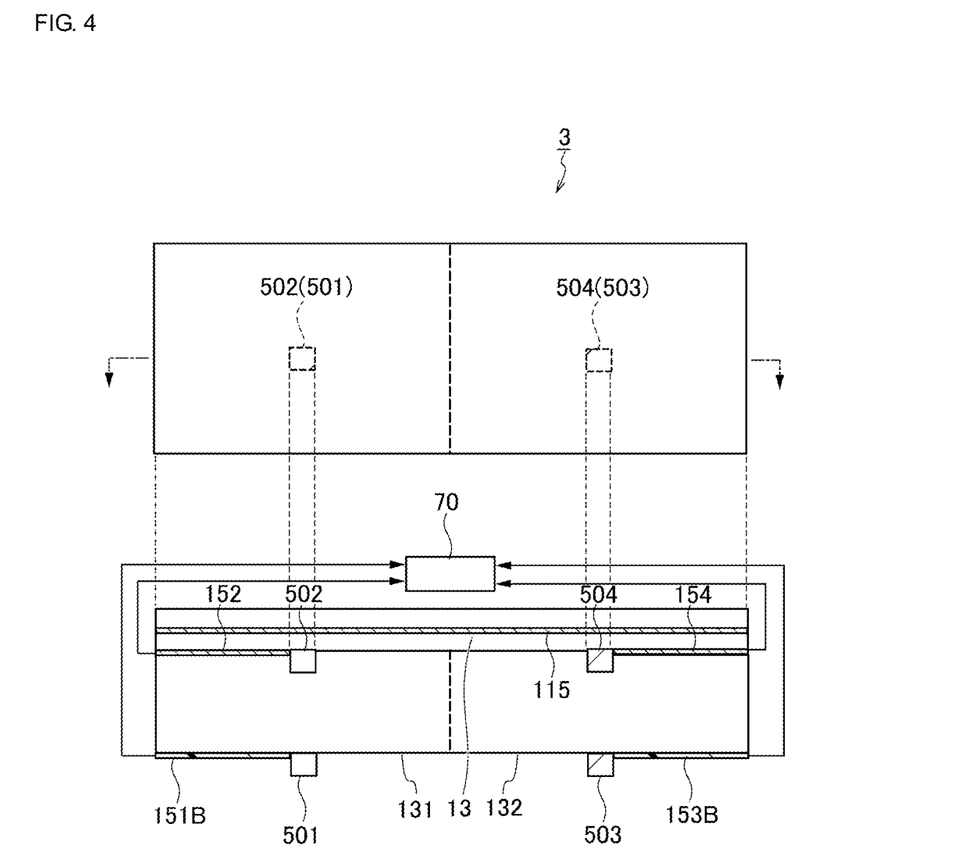
FIG. 4 is a plan view and a cross-sectional view illustrating the configuration of a core body thermometer according to a third exemplary embodiment.
Figure 5:
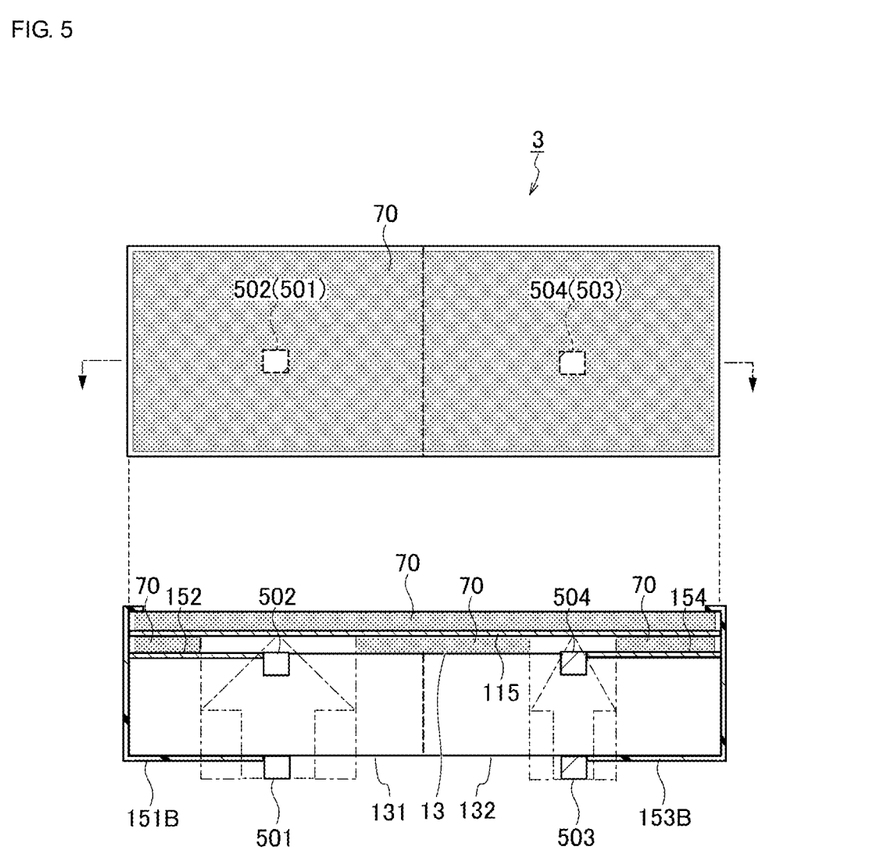
FIG. 5 is a plan view and a cross-sectional view illustrating an arrangeable region of a processing circuit in the core body thermometer according to the third exemplary embodiment.

Next, a core body thermometer 3 according to a third embodiment will be described with reference to FIG. 4 to FIG. 5. Description of the same or similar components as or to those in the above-described second embodiment will be simplified or omitted, and different points will be mainly described. FIG. 4 is a plan view (i.e., an upper view) and a cross-sectional view (i.e., a lower view) illustrating the configuration of the core body thermometer 3. FIG. 5 is a plan view (i.e., an upper view) and a cross-sectional view (i.e., a lower view) illustrating an arrangeable region of the processing circuit 70 in the core body thermometer 3. It is noted that in FIGS. 4 and 5, components that are the same as or equivalent to those in the second embodiment are denoted by the same reference numerals as those in the second embodiment.

The core body thermometer 3 is different from the core body thermometer 2 described above in that it has two thermal resistors having different thermal resistance values, that is, a first thermal resistor 131 and a second thermal resistor 132 instead of the above-described first region 121 and second region 122.

As the first thermal resistor 131, a material having a higher thermal conductivity (i.e., a lower thermal resistance value) than that of the second thermal resistor 132, for example, plastic such as polypropylene, polyethylene, acrylic, polycarbonate, and epoxy resin is preferably used. As the second thermal resistor 132, a material having a lower thermal conductivity (i.e., a higher thermal resistance value) than that of the first thermal resistor 131, for example, foamed plastic (e.g., a foam material) such as polyurethane, polystyrene, and polyolefin is preferably used. However, non-foamed plastic, rubber, or the like can also be used.

The thermal conductivity of the plastic such as polypropylene, polyethylene, acrylic, polycarbonate, and epoxy resin is about 0.1 to 0.5 [W/m/K]. The thermal conductivity of the foamed plastic is further lower than that by about one order of magnitude.

The first thermal resistor 131 and the second thermal resistor 132 are formed so as to have substantially the same thickness in order to achieve cost reduction while allowing a wiring substrate 13 including the thermally homogenizing layer 115 to be laminated thereon. The wiring substrate 13 including the thermally homogenizing layer 115 is formed on the back side (e.g., outside air side) of the first thermal resistor 131 and the second thermal resistor 132. It is noted that the first temperature sensor 501 is connected to the processing circuit 70 with a flexible substrate 151B interposed therebetween. Similarly, the third temperature sensor 503 is connected to the processing circuit 70 with a flexible substrate 153B interposed therebetween. For example, an electric wire, a cable, or the like may be used instead of the flexible substrates 151B and 153B. The second temperature sensor 502 and the fourth temperature sensor 504 are connected to the processing circuit 70 with wiring patterns 152 and 154 interposed therebetween, respectively, as described above.

The processing circuit 70 is arranged at a site (i.e., a region) that does not affect heat flow passing through the first thermal resistor 131 and the second thermal resistor 132. That is to say, as illustrated in FIG. 5, it is preferable that the processing circuit 70 be arranged in a region on the back side (e.g., outside air side) of the thermally homogenizing layer 115 and/or in a region spaced from the first temperature sensor 501 to the fourth temperature sensor 504 by equal to or larger than a predetermined distance (for example, equal to or larger than 10 mm) between the thermally homogenizing layer 115 and the first thermal resistor 131 and the second thermal resistor 132. Other configurations are the same as or similar to those of the above-described second embodiment, and thus detailed description thereof will be omitted here.

According to the exemplary embodiment, two thermal resistors (i.e., the first thermal resistor 131 and the second thermal resistor 132) having the different thermal resistance values and substantially the same thickness are included, and the pair of temperature sensors 50 are arranged for each of the two thermal resistors 131 and 132. Therefore, it is possible to measure temperature distribution generated by the two thermal resistors 131 and 132 having the different thermal resistance values (i.e., temperatures of two heat flow systems having the different thermal resistance values). Further, since the two thermal resistors 131 and 132 having the different thermal resistance values are formed so as to have substantially the same thickness, the configuration can be simplified and the manufacturing cost can be reduced.

According to the embodiment, the processing circuit 70 can be arranged on the back side (e.g., outside air side) of the thermally homogenizing layer 115. Therefore, the arrangeable region of the processing circuit 70 can be expanded and the size of the core body thermometer 3 can be reduced.

In addition, according to the embodiment, the processing circuit 70 (e.g., electronic components) and the first thermal resistor 131 and the second thermal resistor 132 are separated by the thermally homogenizing layer 115. Therefore, estimation accuracy of the core body temperature can be improved while suppressing influences by the heat generation of the electronic components. Further, the processing circuit 70 (e.g., electronic components) and the temperature sensors 50 are separated from each other. Therefore, the estimation accuracy of the core body temperature can be improved while suppressing the influences by the heat generation of the electronic components.

It is noted that although the exemplary embodiments of the invention have been described above, the invention is not limited to the above-described embodiments and various variations are possible. For example, the shapes and sizes of the first region 111 and the second region 112 described above and the arrangement and the like of the first temperature sensor 501 to the fourth temperature sensor 504 are not limited to those in the above-described embodiments and can be arbitrarily set in accordance with requirements such as accuracy, for example.

Moreover, the number, the width, the length, the thickness, the arrangement, and the like of the thermally conductive patterns 113 configuring the first region 111 are not limited to those in the above-described embodiments. Further, in the above-described embodiments, the second region 112 does not have the thermally conductive pattern 113. The second region 112 may however have the thermally conductive patterns 113.

REFERENCE SIGNS LIST 1, 1B, 2, 3 CORE BODY THERMOMETER
11, 11B, 12, 12a, 13 WIRING SUBSTRATE
111, 111B, 121 FIRST REGION
112, 122 SECOND REGION
131 FIRST THERMAL RESISTOR
132 SECOND THERMAL RESISTOR
113 CONDUCTIVE PATTERN (THERMALLY CONDUCTIVE PATTERN)
113B INTERLAYER VIA
115 THERMALLY HOMOGENIZING LAYER
501, 502, 503, 504 FIRST TEMPERATURE SENSOR, SECOND TEMPERATURE SENSOR, THIRD TEMPERATURE SENSOR, FOURTH TEMPERATURE SENSOR
151, 152, 153, 154 WIRING PATTERN
151B, 153B FLEXIBLE SUBSTRATE
70 PROCESSING CIRCUIT

The invention claimed is:

1. A core body thermometer comprising:
a flat plate-shaped thermal resistor having a first region and a second region having different thermal resistances from each other, with the thermal resistor being a multilayer wiring substrate having a plurality of inner layers;
a first temperature sensor and a second temperature sensor disposed to interpose the first region from a thickness direction of the first region;
a third temperature sensor and a fourth temperature sensor disposed to interpose the second region from a thickness direction of the second region; and
a processing circuit configured to process output signals of the first, second, third and fourth temperature sensors,
wherein the first region and the second region have the different thermal resistances from each other based on having at least one of a varying number or dispersion of conductive members,
wherein the conductive members are stacked in the thickness direction of the multilayer wiring substrate with the conductive members arranged in a matrix form of a plurality of rows and a plurality of columns, and
wherein at least a portion of each of the conductive members overlap.

2. The core body thermometer according to claim 1, wherein the processing circuit is mounted on the multilayer wiring substrate,
wherein each of the conductive members is independent of the processing circuit.

3. The core body thermometer according to claim 1, wherein each of the conductive members is a conductive pattern disposed in the multilayer wiring substrate.

4. The core body thermometer according to claim 1, wherein each of the conductive members is at least one through-hole disposed in the multilayer wiring substrate.

5. The core body thermometer according to claim 1, wherein each of the conductive members is at least one interlayer via disposed in the inner layers.

6. The core body thermometer according to claim 1, further including a thermally homogenizing layer disposed on a back side of the first region and on a back side of the second region.

7. The core body thermometer according to claim 6, wherein the thermally homogenizing layer is a solid pattern and is independent of the processing circuit, such that the thermally homogenizing layer is not electrically coupled to the processing circuit.

8. The core body thermometer according to claim 7, wherein the thermally homogenizing layer is integrally formed in the first and second regions of the flat plate-shaped thermal resistor.

9. The core body thermometer according to claim 6, wherein the processing circuit is disposed in a region on a back side of the thermally homogenizing layer that is opposite to the back side of the first and second regions.

10. The core body thermometer according to claim 9, wherein the processing circuit is disposed in a region spaced from the first, second, third and fourth temperature sensors by equal to or larger than a predetermined distance between the thermally homogenizing layer and the first and second regions.

11. The core body thermometer according to claim 1, wherein the conductive members are electrically insulated from the processing circuit.

12. The core body thermometer according to claim 1, wherein the processing circuit comprises a temperature input circuit and an arithmetic processing circuit configured to calculate a core body temperature based on voltage values received by the temperature input circuit from the first, second, third and fourth temperature sensors.

13. The core body thermometer according to claim 1, wherein each of the conductive members is disposed only in the first region and not the second region of the thermal resistor to provide the respective different thermal resistances.

14. A core body thermometer comprising:
a flat plate-shaped thermal resistor having a first region and a second region having different thermal resistances from each other, with the thermal resistor being a wiring substrate;
a first temperature sensor and a second temperature sensor disposed to interpose the first region from a thickness direction of the first region;
a third temperature sensor and a fourth temperature sensor disposed to interpose the second region from a thickness direction of the second region; and
a processing circuit configured to process output signals of the first, second, third and fourth temperature sensors,
wherein the first region and the second region have different thermal resistances from each other based on having at least one of a varying number or dispersion of conductive members disposed in the respective regions of the thermal resistor,
wherein the wiring substrate is a multilayer wiring substrate having a plurality of inner layers, wherein the conductive members are stacked in the thickness direction of the multilayer wiring substrate with the conductive members arranged in a matrix form of a plurality of rows and a plurality of columns, and
wherein each of the conductive members is independent of the processing circuit.

15. The core body thermometer according to claim 14, wherein at least a portion of each of the conductive members overlap, and
wherein the processing circuit is mounted on the multilayer wiring substrate.

16. The core body thermometer according to claim 15, wherein each of the conductive members is a conductive pattern disposed in the wiring substrate.

17. The core body thermometer according to claim 14, wherein each of the conductive members is at least one through-hole disposed in the wiring substrate.

18. The core body thermometer according to claim 14, further including a thermally homogenizing layer disposed on a back side of the first region and on a back side of the second region.

19. The core body thermometer according to claim 18, wherein the thermally homogenizing layer is a solid pattern and is independent of the processing circuit, such that the thermally homogenizing layer is not electrically coupled to the processing circuit.

20. The core body thermometer according to claim 18, wherein the processing circuit is disposed in a region on a back side of the thermally homogenizing layer that is opposite to the back side of the first and second regions.

21. The core body thermometer according to claim 14, wherein each of the conductive members is disposed only in the first region and not the second region of the thermal resistor to provide the respective different thermal resistances.

* * * * *